S. M. CATE.
Railway Car-Axles.
No. 153,701.
Patented Aug. 4, 1874.
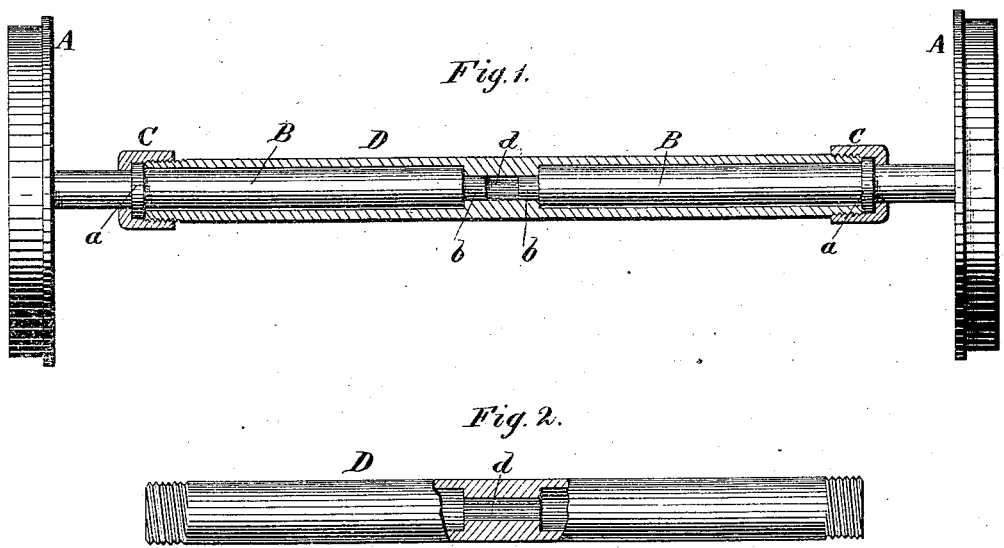

UNITED STATES PATENT OFFICE.

STEPHEN M. CATE, OF BRIDGEPORT, CONNECTICUT.

IMPROVEMENT IN RAILWAY-CAR AXLES.

Specification forming part of Letters Patent No. 153,701, dated August 4, 1874; application filed June 16, 1874.

*To all whom it may concern:*

Be it known that I, STEPHEN M. CATE, of Bridgeport, county of Fairfield and State of Connecticut, have invented certain new and useful Improvements in Railway-Car Axles, of which the following is a specification:

The nature of my invention consists in the construction and arrangement of an axle for street or other railroad cars, to overcome friction on the sliding of the wheels around curves, as will be hereinafter more fully set forth.

In order to enable others skilled in the art to which my invention appertains to make and use the same, I will now proceed to describe its construction and operation, referring to the annexed drawing, in which—

Figure 1 is a longitudinal section of my car-axle; and Fig. 2 is a side view, partly in section, of the central part thereof.

A A represent two car-wheels, constructed in any of the known and usual ways. Each of these wheels is shrunk upon, or otherwise permanently secured to, a spindle, B. On this spindle, a suitable distance inward from the wheel, is formed or attached a collar, $a$, and between this collar and the wheel is first placed a loose nut, C, which can be moved over the collar, and has an interior flange to bear against the outer side of the collar like an ordinary stuffing-box. Upon the inner end of each spindle B is turned a journal, $b$. The spindles B B are inserted, one from each end, into a tubular axle or sleeve, D, up to the collar $a$, and then the nuts or boxes C C are screwed upon said axle, securing the parts together, but allowing the spindles to turn in the axle. The interior diameter of the axle or sleeve D is larger than that of the spindles, and the journals $b\ b$, formed upon the inner ends of the spindles fit in bearings $d$, formed in the center of the axle. Each spindle thus has a bearing near the center of the axle D, and between said bearing and the collar $a$ there is no contact between the inner and the outer parts of the axle and spindle, but a free space left entirely between them.

One of the spindles, at either end, may be screwed up so as to make it stationary, while the other is free; and when one end is worn badly it can be screwed tight and the other left free, or both may turn in the axle, as desired, without detriment to either wheel or the working of the same.

By this construction the friction is materially reduced and the necessity of having the wheels of exact size avoided, and more leverage is obtained by spreading the bearings and making the axle self-sustaining in perfect line. Another advantage is, that the old spindles or shafts may be cut and the worn-out journals used for the center, new wheels put on, new journals turned by cutting them and changing ends or turning the worn-out parts to the center, and collars be shrunk on, and thus securing all parts in their places.

I am aware that it is not new to attach car-wheels on separate spindles and couple them together by a sleeve or hollow axle in which the spindles revolve, and hence I do not claim such, broadly, as my invention.

Having thus fully described my invention, what I claim as new, and desire to secure by Letters Patent, is—

The combination of the spindles B B, each provided with a wheel, A, collar $a$, and journals $b$, and the hollow sleeve D, provided with center interior bearing $d$, substantially as and for the purposes set forth.

In testimony that I claim the foregoing as my invention I hereunto affix my signature this 13th day of June, 1874.

STEPHEN M. CATE.

Witnesses:
  S. L. BLAKE,
  A. B. BEERS.